(12) United States Patent
Cary

(10) Patent No.: US 7,150,474 B2
(45) Date of Patent: Dec. 19, 2006

(54) PERMANENTLY MOUNTED HOSE FITTING AND METHOD FOR FILLING TANK CARS

(76) Inventor: Chester Cary, 7155 Heron, Houston, TX (US) 77087

( * ) Notice: Subject to any disclaimer, the term of this patent is extended or adjusted under 35 U.S.C. 154(b) by 402 days.

(21) Appl. No.: 10/292,009

(22) Filed: Nov. 12, 2002

(65) Prior Publication Data

US 2004/0090063 A1    May 13, 2004

(51) Int. Cl.
  *B65B 1/04* (2006.01)
  *F16L 3/00* (2006.01)
  *B65G 65/32* (2006.01)

(52) U.S. Cl. .............. 285/63; 285/62; 285/133.11; 141/382; 414/299

(58) Field of Classification Search .......... 285/62, 285/63, 133.11, 133.3; 141/382; 414/293, 414/299, 301, 302; 137/561 A, 590, 592
See application file for complete search history.

(56) References Cited

U.S. PATENT DOCUMENTS

| 619,437 | A | | 2/1899 | Pool |
|---|---|---|---|---|
| 1,759,321 | A | * | 5/1930 | Oldfield ............. 285/125.1 |
| 1,954,581 | A | * | 4/1934 | Wortmann ............. 220/567.1 |
| 2,396,163 | A | | 3/1946 | Dies |
| 2,916,308 | A | * | 12/1959 | Voldrich et al. ............. 285/45 |
| 2,957,283 | A | * | 10/1960 | Mitchell ............. 53/426 |
| 3,171,427 | A | * | 3/1965 | McAlpine ............. 137/268 |
| 3,381,982 | A | | 5/1968 | Elek |
| 3,396,762 | A | * | 8/1968 | Paton ............. 141/7 |
| 3,486,771 | A | | 12/1969 | Conlin |
| 4,007,766 | A | * | 2/1977 | Hurst ............. 141/98 |
| 4,008,739 | A | * | 2/1977 | Hurst et al. ............. 141/35 |
| 4,360,306 | A | * | 11/1982 | van der Burgt ............. 414/217 |
| 4,513,795 | A | * | 4/1985 | Davis et al. ............. 141/35 |
| 4,648,628 | A | | 3/1987 | Meadows et al. |
| 4,703,785 | A | * | 11/1987 | Antos et al. ............. 141/326 |
| 4,711,274 | A | * | 12/1987 | Mowatt-Larssen ............. 141/5 |
| 4,722,555 | A | | 2/1988 | Soultatis |
| 4,930,816 | A | | 6/1990 | Biing-Yih |
| 5,065,781 | A | | 11/1991 | Cox |
| 5,104,150 | A | | 4/1992 | Bard et al. |
| 5,131,697 | A | | 7/1992 | Shumway |
| 5,681,058 | A | | 10/1997 | Hwang |
| 5,836,362 | A | * | 11/1998 | Ackley et al. ............. 141/286 |
| 5,842,783 | A | * | 12/1998 | Boasso et al. ............. 366/101 |
| 5,927,762 | A | | 7/1999 | Webb |
| 6,058,968 | A | * | 5/2000 | Carter ............. 137/561 A |
| 6,443,193 | B1 | * | 9/2002 | Blasco ............. 141/286 |

* cited by examiner

*Primary Examiner*—James M. Hewitt
(74) *Attorney, Agent, or Firm*—D'Ambrosio & Associates, PLLC

(57) ABSTRACT

The present invention relates to a permanently mounted hose fitting for filling tank cars that facilitates the insertion of the hose into the top of the tank car to disperse material, pellet-like particles for example, throughout the tank car. The secured hose fitting of this invention is permanently affixed to the top of the tank. One preferred embodiment of a hose fitting for filling tank cars with particulate matter comprises a t-shaped pipe that defines a bore there-through. The t-shaped pipe comprises a tubular member and an intermediate leg extending substantially perpendicular from the tubular member. The intermediate leg has an intermediate leg end that is adapted to couple with a hose. A securing flange radiates outwardly from the intermediate leg and is adapted to fixedly attach the hose fitting to the top of the tank car.

23 Claims, 2 Drawing Sheets

PERMANENTLY MOUNTED HOSE FITTING AND METHOD FOR FILLING TANK CARS

FIELD OF THE INVENTION

The present invention relates to a permanently mounted hose fitting and method for filling tank cars. More particularly, the present invention relates to a permanently mounted hose fitting and method for filling railroad and truck tank cars with pellet-like or powdery materials.

BACKGROUND

Transferring materials from a one tank to another, for example, a tanker truck to a railroad tank car by hose is a cumbersome and time-consuming chore. This is especially true of the process of filling tank cars with pellet-like materials. Pellet-like materials such as plastic pellets are lightweight and tend to fly about. Railroad tank cars for carrying pellet-like particles typically have a rectangular configuration with a v-shaped bottom. The top of the tank car has two or three hatched openings for loading the tank car and an opening in the v-shaped bottom for unloading. Materials for loading the tank cars are often transported to the tank cars by truck. The driver of the truck must transfer the load to the tank car by means of a high-pressure hose. A truck compressor is used to blow the pellets out of the truck, though the hose and into the tank car. This can be difficult. High-pressure hoses are heavy. Uneven mounds form in which the sides of the railroad tank are not utilized and thereby leaving unfilled spaces within the tank car.

As the pile of lightweight pellets approach the top of the railroad tank in uneven mounds, the pellets, under pressure, tend to fly out of the openings and scatter into the surrounding environs. Pellets flying out of the tank car can be dangerous to the loader of the tank car who can slip and fall. Also this loss of pellets is a financial loss as well as an environmental problem. The scattering of pellets is especially dangerous if the pellets are hazardous materials.

T-type couplers are well known. Cox, in U.S. Pat. No. 5,065,781, discloses a apparatus for removing density materials from the bottom of an oil storage tank that provides an extended bottom hose with multiple openings. The hose lies on the bottom of the tank. Reference U.S. Pat. No. 5,065,781 discloses attaching a rope to the free end of a bottom hose and lowering the T-coupling until it is inside the tank, recovering the free end and attaching it to T-coupling. The bottom hose is attached to a riser through which liquid is removed from the tank.

Soultatis, in U.S. Pat. No. 4,722,555, discloses a quick connect coupling having heads unified with a pipe. It is a quick connect pressurized coupling assembly having mating male and female headboards, each attached to an outwardly flared pipe end. The Soultatis device uses two hooks adapted for attachment to the male part of the coupling device providing male and female head parts to be connected together to provide a pressurized joint for pipes.

Shumway, U.S. Pat. No. 5,131,697, discloses a pipe and coupling system that is fabricated for use in conjunction with a locking pin type readless couplings, the pipe has a thin wall configuration achieved by fabricating it from high tense steel.

Meadows et al., U.S. Pat. No. 4,648,628, discloses a branch hose constructing and T-connector used in methods of making the hose construction with T-connector. The branched hose construction comprises a T-connector having a body portion provided with a pair of substantially oppositely directed legs extending outward.

Bard et al., U.S. Pat. No. 5,104,150, discloses a multiple purpose irrigation fitting. The fitting comprises a tee shaped fitting for connecting porous and non-porous irrigation tubing. The tee shaped fitting is also connected to garden hoses with three openings and includes caps. The fitting is collapsible at one or more openings with caps so that one fitting can be used as a elbow, coupling, tee, or end cap, thus avoiding the purchase of many different kinds of fittings.

None of the above-referenced patents disclose a hose fitting that facilitates the loading of pellet-like particles in tank cars. A problem exists in that existing hose fittings are heavy and must be carried and attached to the tank car for each use.

SUMMARY

The present invention relates to a permanently mounted hose fitting for filling tank cars that facilitates the insertion of the hose into the top of the tank car and disperses the material, pellet-like particles for example, evenly throughout the tank car thereby avoiding mounding and empty spaces. Unlike a related patent for a hose fitting and method for filling tank cars, Cary, U.S. Pat. No. 6,311,744, incorporated herein in its entirety, the secured hose fitting of this invention is permanently affixed to the top of the tank and loads the tank car evenly, without pellets flying out to pollute the environment.

Advantageously, the hose fitting of the present invention stops the high pressure filling action when the pellet-like particles reach the top of the hose fitting so that pellets are not lost to the environment. One preferred embodiment of a hose fitting for filling tank cars with particulate matter comprises a t-shaped pipe that defines a bore there-through. The t-shaped pipe comprises a tubular member and an intermediate leg extending substantially perpendicular from the tubular member. The intermediate leg is preferably integral with, and in fluid communication with, the tubular member. The intermediate leg has an intermediate leg end that is adapted to couple with a hose. In one preferred embodiment, a securing flange can radiate outwardly from the intermediate leg and is adapted to attach the hose fitting to the tank car, a railroad tank car for example.

In an alternative embodiment, a permanently mounted hose fitting for filing tank cars with particulate matter comprises a t-shaped pipe that defines a bore there-through. The t-shaped pipe is comprised of a tubular member and a t-leg substantially perpendicular to the tubular member. The t-leg has a t-leg end. An intermediate leg is attached to and in fluid communication with the t-leg, the intermediate leg comprising an intermediate leg end that is adapted to couple with a hose. A securing flange can radiate outwardly from the intermediate leg and is adapted to attach the hose fitting to the tank car. Preferably, the securing flange and intermediate leg are manufactured from steel.

In another preferred embodiment, the securing flange comprises welding material and the securing flange is configured to be welded to the top of the tank car. Alternatively, the securing flange comprises bolting means, nuts and bolts for example, that are adapted to bolt the securing flange to the top of a tank car. In still another alternative, the intermediate leg is welded or bolted directly to the top of a tank car.

DETAILED DESCRIPTION OF DRAWINGS

Broadly, this invention relates to a permanently mounted hose fitting and method for filling tank cars such as railroad hoppers with pellet like particles, grain, sugar, powders and plastic or chemical pellets, or other particulate matter for example. Trucks transfer loads of pellets to a railroad car through a hose connecting the two. The load is transferred to the hopper by compressed air. The hose fitting of this invention is permanently mounted to the top of the tank car by welding, nuts and bolts or other fastening means known in the art, and when a hose is attached, allows for the filling of the tank car in an evenly manner, without loss of pellets. The user connects the hose from the truck to the permanently mounted hose fitting when filling the tank car. A cap is used to close off the hose fitting when not in use.

Figure 2:
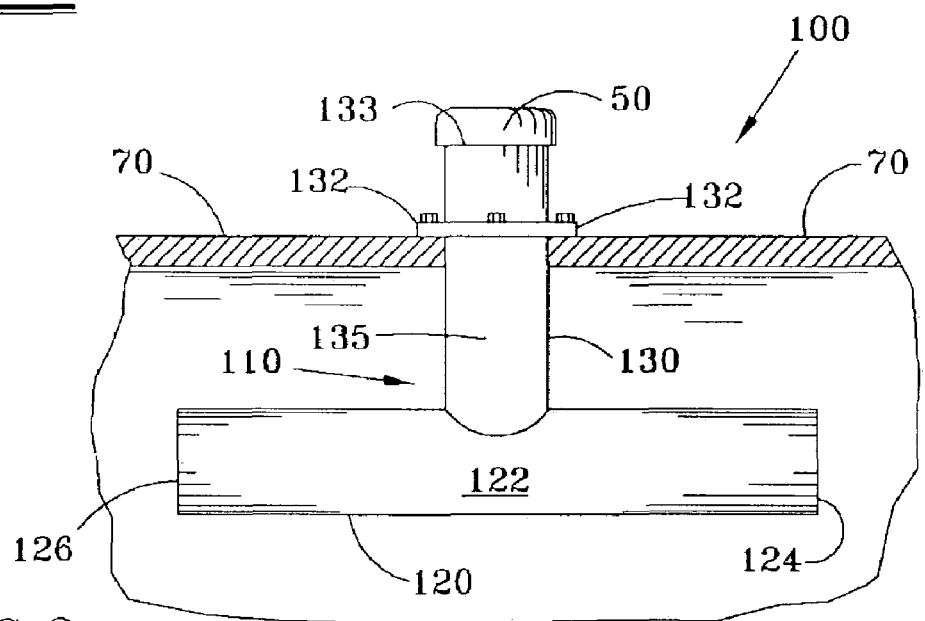
FIG. 2 is a cross-sectional view of another embodiment of the permanently mounted hose fitting.

Referring to FIG. 2, one preferred embodiment of a permanently mounted hose fitting 100 for filing tank cars with particulate matter according to this invention comprises a t-shaped pipe 110 defining a bore 122 there-through. The t-shaped pipe 110 comprising a tubular member 120 and an intermediate leg 130 extending substantially perpendicular from the tubular member 120, the intermediate leg 130 is integral with and in fluid communication with the tubular member 120. The intermediate leg 130 defines a passageway 135 that is integral with and in fluid communication with the tubular member 120, and comprises an intermediate leg end 133 adapted to couple with a hose. A securing flange 132 is positioned on the intermediate leg 130 radiating outwardly from the intermediate leg, the securing flange 132 is adapted to attach the hose fitting 100 to the top of the tank car 70. The securing flange 132 can comprise holes that align with openings on the top of the tank car 70 so to that bolts can be used to securely fasten the hose fitting 100 to the tank car. Alternatively, securing flange 132 can be welded onto the top of the tank car 132. Other methods of attachment are known in the art.

A detachable waterproof cap 50 is configured to couple with the intermediate leg end 133 to close off the hose fitting 100 when not in use so that rain, debris etc. does not get into the tank car. When the tank car needs to be filled with pellets, the user will remove the cap 50 and then attach one end of a hose to a truck (not shown) or other container and the other end to the intermediate leg end 133 and pump the pellets into the tank car. Compressors on the truck provide high pressure air to drive the pellets from the truck to the tank car.

The pellets enter into the passageway of the intermediate leg end 135 and are diverted out of either leg 124,126 of the tubular member 120. Because the pellets shoot out from the legs 124,126 of the tubular member 120 rather than the hose opening itself, the pellets can bounce off the side of the tank car 100 and fill the car evenly without empty spaces. The pumping action substantially ceases when the pellet-like particles reach the top of the bores of the t-shaped pipe 20 so that a minimum of pellets are lost through the openings at the top of the tank car.

When loading a tank car, pellets move at high speeds through the hose and hose fitting. Precautions are required to prevent heat build up, especially for pellets that have low heat tolerance. Smooth, integral walls are required to reduce any heat caused by the friction of the pellets moving through the tubular member 120.

Figure 1:
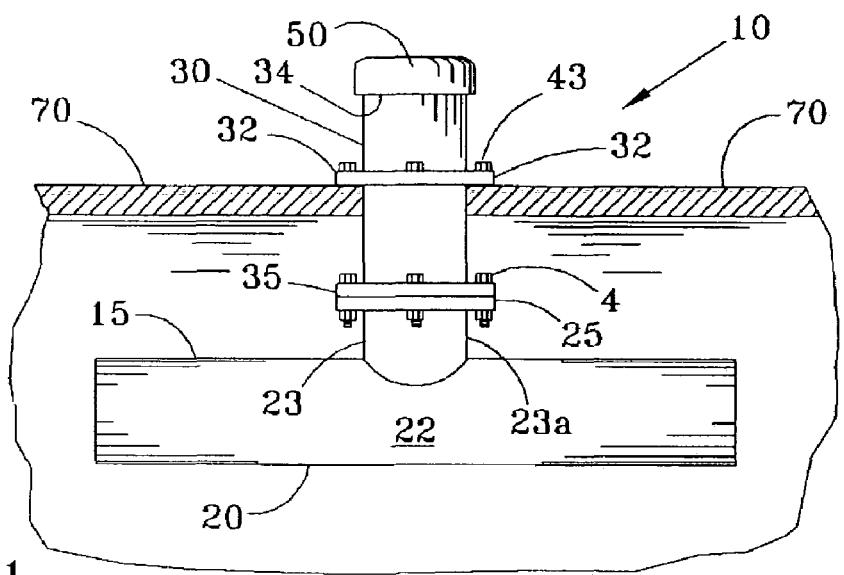
FIG. 1 a cross-sectional view one embodiment of the permanently mounted hose fitting.

When welding is used as the method of attaching the securing flange 132 to the top of the tank car, both the tank car and securing flange 132 of the hose fitting 100 must be comprised of the same material. For example, typically tank cars are manufactured from steel. If so, then the securing flange 132 must also be manufactured from steel so that it can be welded onto the top of the tank car 70. FIG. 2 illustrates an embodiment of the hose fitting in which the intermediate leg 130 is integral with the securing flange 132 and the tubular member 120. In this embodiment 100, the entire hose fitting would have to be made of steel. FIG. 1 illustrates another embodiment of this invention wherein the tubular member 20 is substantially comprised of aluminum and the intermediate leg 30 and securing flange 32 are substantially comprised of a welding material for ease of welding the hose fitting 10 to the top of the tank car 70. Preferably the intermediate leg 30 and securing flange 32 are made from steel for welding onto steel tank cars.

In an alternative embodiment, the securing flange 32 comprises welding material and the securing flange 32 is configured to be welded to the top of the tank car. In another aspect, the securing flange can comprise bolting means, or holes for receiving bolts 43 and is adapted to be bolted to the top of a tank car.

It is economically more advantageous to manufacture the tubular member 20 from aluminum. Referring to FIG. 1, one embodiment of the permanently mounted hose fitting 10 for filing tank cars with particulate matter comprises a t-shaped pipe 15 defining a bore 22 therethrough. The t-shaped pipe 15 comprises a tubular member 20 and a t-leg 23 substantially perpendicular to the tubular member 20. The t-leg 23 has a t-leg end 25. An intermediate leg 30 is attached to and in fluid communication with the t-leg 23. Preferably, the intermediate leg 30 has an intermediate leg end 34 that is adapted to couple with a hose when filling the tank car. A securing flange 32 radiates outwardly from the intermediate leg 30 and is adapted to attach the hose fitting 10 to top of the tank car 70. In one embodiment, the securing flange 32 and the intermediate leg 30 are made of steel so that they can be welded to the top of a steel tank car. Alternatively, the securing flange comprises welding material and the securing flange is configured to be welded to the top of the tank car.

In an alternative means to permanently attach the hose fitting 10 to the tank car, the securing flange comprises bolting means 43, holes or openings, to bolt the hose fitting 10 to the top of the tank car 70.

In one preferred embodiment of a permanently mounted hose fitting for filing tank cars with particulate matter, the hose fitting 10 comprises a t-shaped pipe 15 that defines a bore 22 therethrough. The t-shaped pipe 15 has a tubular member 20 and a t-leg 23 substantially perpendicular to the tubular member 20; the t-leg 23 comprising a t-leg end 23a. The t-leg end 23a has an outwardly radiating seat 25. The intermediate leg 30 attaches to and is in fluid communication with the t-leg 23. The intermediate leg 30 comprising a first end 34 adapted to couple with a hose and a second end 35 adjacent to the t-leg 23. The second end 35 forms a ledge 35 that is immediately adjacent the seat 25. Attachment means, such as bolts 4 are used to attach the ledge 35 to the seat 25. Preferably a securing flange 32 radiates outwardly from the intermediate leg and is configured to be welded or fixedly attached to the top of the tank car 70. The intermediate leg 30 with its securing flange 32 can then be manufactured from steel or other welding material for welding the hose fitting 10 onto the tank car. The t-leg 23 can be manufactured from a less expensive material such as aluminum or high quality plastic.

Figure 3:
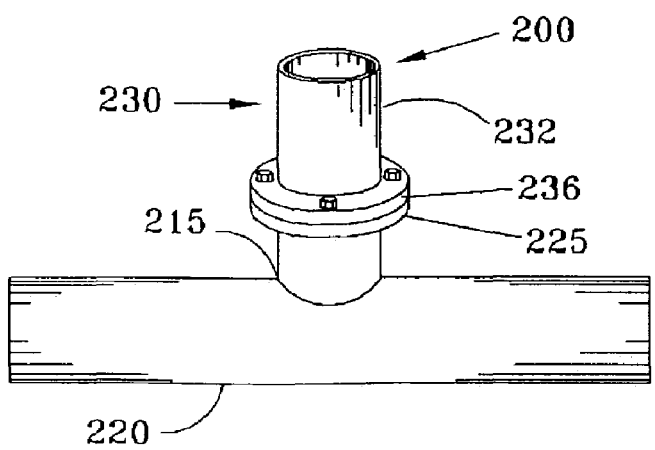
FIG. 3 is a cross-sectional view of FIG. 1 illustrating an embodiment of the permanently mounted hose fitting that is mounted directly to the top of a tank car.
Figure 4:
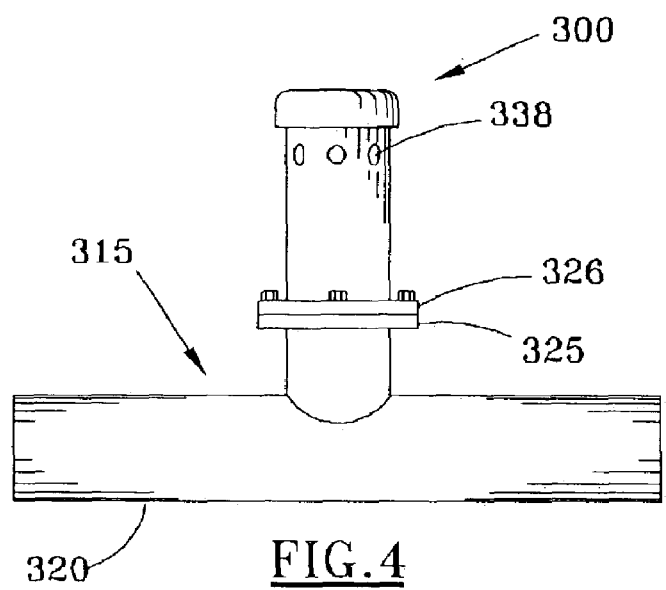
FIG. 4 is a cross-sectional view of FIG. 1 illustrating an alternative embodiment of the permanently mounted hose fitting that is mounted directly to the top of a tank car.
Figure 5:
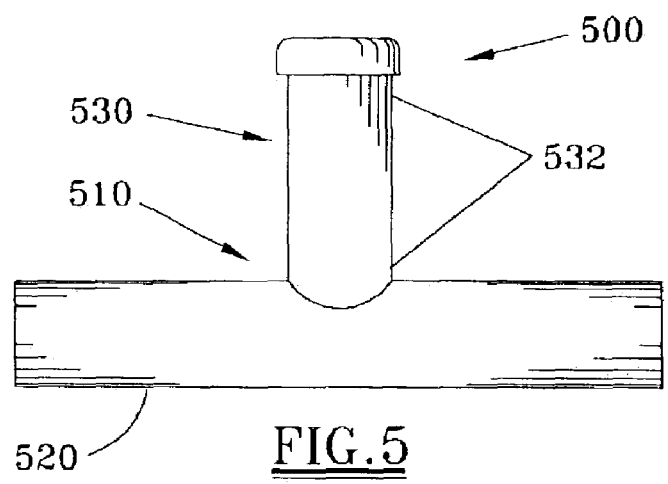
FIG. 5 is a cross-sectional view of FIG. 2 depicting another embodiment of the permanently mounted hose fitting that is mounted directly to the top of a tank car by welding.

In several alternative embodiments of this invention as illustrated in FIGS. 3, 4, 5, and 6, the intermediate leg is securely attached to the top of the tank car directly without the need for a securing flange. FIG. 5 illustrates an embodiment of the permanently mounted hose fitting for filing tank cars 500 in which the hose fitting comprises a t-shaped pipe 510 that defines a bore. The t-shaped pipe 510 comprises a tubular member 520 and an intermediate leg 530 extending substantially perpendicular from the tubular member, the intermediate leg 530 integral with and in fluid communication with the tubular member 520. The intermediate leg 530 comprising an intermediate leg end adapted to couple with a hose. In this embodiment, the hose fitting 500 attaches directly to the top of the tank car. To accomplish this, the intermediate leg 530 comprises a weldable section 532 that is adapted to be welded directly to the top of a tank car.

Figure 6:
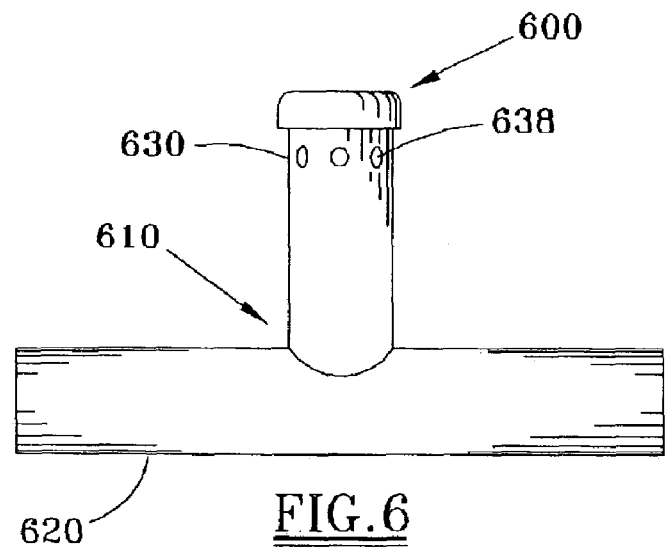
FIG. 6 is a cross-sectional view of FIG. 2 depicting still another embodiment of the permanently mounted hose fitting that is mounted directly to the top of a tank car by bolting.

Alternatively as shown in FIG. 6, the intermediate leg 630 comprises one or more bolt holes 638 for bolting the hose fitting to a top of a tank car.

FIGS. 3 and 4 illustrate a permanently mounted hose fitting for filing tank cars 200, 300 comprising a t-shaped pipe 215, 315 that defines a bore. The t-shaped pipe 215, 315 comprising a tubular member 220, 320 and a t-leg substantially perpendicular to the tubular member. The t-leg comprising a t-leg end, the t-leg end having an outwardly radiating seat. 225, 325. An intermediate leg 230, 330 is attached to and in fluid communication with the t-leg. The intermediate leg 230, 330 comprises a first end adapted to couple with a hose and a second end adjacent to the t-leg, the second end comprising a ledge 236, 336. The ledge 236, 336 is immediately adjacent to the seat 225, 325 of the t-shaped pipe 215, 315. In FIG. 3, attachment means, such as bolts, attach the ledge 236 to the seat 235. A weldable section 232 is positioned along the intermediate leg 230, the weldable section 232 configured to be welded to a top of a tank car. FIG. 4 depicts another method of attaching the hose fitting 300 to the top of the tank car. In FIG. 4, the intermediate leg 330 comprises one or bolt holes 338 for bolting the hose fitting 300 to the top of a tank car.

Advantageously, the hose fitting 10,100, 200, 300, 500, 600, of the present invention substantially stops the high pressure filling action when the pellet-like particles reach the top of the hose fitting so that pellets do not fly out of opening and are not lost to the environment.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

The invention claimed is:

1. A permanently mounted hose fitting for filling tank cars with particulate matter comprising:
    a t-shaped pipe defining a bore therethrough, the t-shaped pipe comprising a tubular member and an intermediate leg extending substantially perpendicular from the tubular member, the intermediate leg integral with and in fluid communication with the tubular member, the intermediate leg comprising an intermediate leg end adapted to couple with a hose; and
    a securing flange radiating outwardly from the intermediate leg, the securing flange adapted to attach the hose fitting to the tank car.

2. The permanently mounted hose fitting of claim 1 further comprising a detachable waterproof cap configured to couple with the intermediate leg end.

3. The permanently mounted hose fitting of claim 1 wherein the tubular member is substantially comprised of aluminum and the intermediate leg and securing flange are substantially comprised of steel.

4. The permanently mounted hose fitting of claim 1 wherein the securing flange comprises welding material and the securing flange is configured to be welded to the top of the tank car.

5. The permanently mounted hose fitting of claim 1 wherein the securing flange comprises bolting means and is adapted to be bolted to the top of the tank car.

6. The permanently mounted hose fitting of claim 1 wherein the t-shaped pipe is substantially comprised of aluminum.

7. A permanently mounted hose fitting for filling tank cars with particulate matter comprising:
    a t-shaped pipe defining a bore therethrough, the t-shaped pipe comprising a tubular member and a t-leg substantially perpendicular to the tubular member, the t-leg comprising a t-leg end;
    an intermediate leg attached to and in fluid communication with the t-leg, the intermediate leg comprising an intermediate leg end adapted to couple with a hose; and
    a securing flange radiating outwardly from the intermediate leg, the securing flange adapted to attach the hose fitting to the tank car, the securing flange and the intermediate leg comprising steel.

8. The permanently mounted hose fitting of claim 7 wherein the securing flange comprises welding material and the securing flange is configured to be welded to the top of the tank car.

9. The permanently mounted hose fitting of claim 7 wherein the securing flange comprises bolting means adapted to bolt the hose fitting to the top of the tank car.

10. A permanently mounted hose fitting for filling tank cars with particulate matter comprising:
    a t-shaped pipe defining a bore therethrough, the t-shaped pipe comprising a tubular member and a t-leg substantially perpendicular to the tubular member, the t-leg comprising a t-leg end, the t-leg end comprising an outwardly radiating seat;
    an intermediate leg attached to and in fluid communication with the t-leg, the intermediate leg comprising a first end adapted to couple with a hose and a second end adjacent to the t-leg, the second end comprising a ledge, the ledge immediately adjacent the seat; and
    a securing flange radiating outwardly from the intermediate leg, the securing flange adapted to attach the hose fitting to the tank car.

11. The permanently mounted hose fitting of claim 10 wherein the securing flange comprises welding material and the securing flange is configured to be welded to the top of the tank car.

12. The permanently mounted hose fitting of claim 10 wherein the securing flange comprises bolting means.

13. A permanently mounted hose fitting for filling tank cars with particulate matter comprising:
   a t-shaped pipe defining a bore therethrough, the t-shaped pipe comprising a tubular member and a t-leg substantially perpendicular to the tubular member, the t-leg comprising a t-leg end, the t-leg end comprising an outwardly radiating seat;
   an intermediate leg attached to and in fluid communication with the t-leg, the intermediate leg comprising a first end adapted to couple with a hose and a second end adjacent to the t-leg, the second end comprising a ledge, the ledge immediately adjacent the seat;
   attachment means to attach the ledge to the seat; and
   a securing flange radiating outwardly from the intermediate leg, the securing flange adapted to attach the hose fitting to the tank car.

14. The permanently mounted hose fitting of claim 13 further comprising a detachable waterproof cap configured to couple with the intermediate leg first end.

15. The permanently mounted hose fitting of claim 13 wherein the means of attachment for the seat to the ledge comprises bolts.

16. The permanently mounted hose fitting of claim 13 wherein the tubular member and the t-leg are substantially comprised of aluminum and the intermediate leg and securing flange are substantially comprised of steel.

17. The permanently mounted hose fitting of claim 13 wherein the securing flange comprises welding material and the securing flange is configured to be welded to the top of the tank car.

18. The permanently mounted hose fitting of claim 13 wherein the securing flange comprises bolting means.

19. A permanently mounted hose fitting for filling tank cars with particulate matter comprising:
   a t-shaped pipe defining a bore therethrough, the t-shaped pipe comprising a tubular member and a t-leg substantially perpendicular to the tubular member, the t-leg comprising a t-leg end, the t-leg end comprising an outwardly radiating seat;
   an intermediate leg attached to and in fluid communication with the t-leg, the intermediate leg comprising a first end adapted to couple with a hose and a second end adjacent to the t-leg, the second end comprising a ledge, the ledge immediately adjacent the seat,
   attachment means to attach the ledge to the seat; and
   a securing flange radiating outwardly from the intermediate leg, the securing flange adapted to attach the hose fitting to the tank car, the securing flange and intermediate leg comprising weldable material configured to weld the securing flange to the top of the tank car.

20. A permanently mounted hose fitting for filling tank cars with particulate matter comprising:
   a t-shaped pipe defining a bore therethrough, the t-shaped pipe comprising a tubular member and an intermediate leg extending substantially perpendicular from the tubular member, the intermediate leg integral with and in fluid communication with the tubular member, the intermediate leg comprising an intermediate leg end adapted to couple with a hose; and
   the intermediate leg comprising a weldable section, the weldable section adapted to be welded to a top of a tank car.

21. A permanently mounted hose fitting for filling tank cars with particulate matter comprising:
   a t-shaped pipe defining a bore therethrough, the t-shaped pipe comprising a tubular member and an intermediate leg extending substantially perpendicular from the tubular member, the intermediate leg integral with and in fluid communication with the tubular member, the intermediate leg comprising an intermediate leg end adapted to couple with a hose; and
   the intermediate leg comprising one or bolt holes for bolting the hose fitting to a top of a tank car.

22. A permanently mounted hose fitting for filling tank cars with particulate matter comprising:
   a t-shaped pipe defining a bore therethrough, the t-shaped pipe comprising a tubular member and a t-leg substantially perpendicular to the tubular member, the t-leg comprising a t-leg end, the t-leg end comprising an outwardly radiating seat;
   an intermediate leg attached to and in fluid communication with the t-leg, the intermediate leg comprising a first end adapted to couple with a hose and a second end adjacent to the t-leg, the second end comprising a ledge, the ledge immediately adjacent the seat,
   attachment means to attach the ledge to the seat; and
   a weldable section positioned along the intermediate leg, the weldable section configured to be welded to a top of a tank car.

23. A permanently mounted hose fitting for filling tank cars with particulate matter comprising:
   a t-shaped pipe defining a bore therethrough, the t-shaped pipe comprising a tubular member and a t-leg substantially perpendicular to the tubular member, the t-leg comprising a t-leg end, the t-leg end comprising an outwardly radiating seat;
   an intermediate leg attached to and in fluid communication with the t-leg, the intermediate leg comprising a first end adapted to couple with a hose and a second end adjacent to the t-leg, the second end comprising a ledge, the ledge immediately adjacent the seat,
   attachment means to attach the ledge to the seat; and
   the intermediate leg comprising one or bolt holes for bolting the hose fitting to a top of a tank car.

\* \* \* \* \*